US006985513B2

(12) United States Patent
Zeira

(10) Patent No.: US 6,985,513 B2
(45) Date of Patent: Jan. 10, 2006

(54) CHANNEL ESTIMATION FOR TIME DIVISION DUPLEX COMMUNICATION SYSTEMS

(75) Inventor: Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1069 days.

(21) Appl. No.: 09/755,400

(22) Filed: Jan. 5, 2001

(65) Prior Publication Data

US 2002/0006122 A1 Jan. 17, 2002

Related U.S. Application Data

(60) Provisional application No. 60/175,167, filed on Jan. 7, 2000.

(51) Int. Cl.
*H04B 1/69* (2006.01)
*H04B 7/216* (2006.01)
(52) U.S. Cl. ....................... 375/147; 370/342
(58) Field of Classification Search ............... 357/316, 357/341, 362–368, 130, 140, 141, 146, 147
See application file for complete search history.

(56) References Cited

U.S. PATENT DOCUMENTS 5,933,768 A 8/1999 Sköld et al.
5,970,060 A 10/1999 Baier et al.

FOREIGN PATENT DOCUMENTS

CN 1163024 10/1997
EP 0480507 A 4/1992

OTHER PUBLICATIONS

Benvenuto et al., "Joint Detection with Low Computational Complexity for Hybrid TD-CDMA Systems," IEEE, 2000 pp245-253.*

Jung-Lin et al., "Low Complexity Data Detection Using Fourier Transform Decompostion of Channel Correlation Matrix," 2001, IEEE, pp 1322-1326.*
Anja Klein and Paul W. Baier, "Linear Unbiased Data Estimation in Mobile Radio Systems Applying CDMA", IEEE Journal on Selected Areas in Communications, vol. 11, No. 7, Sep. 1993, pp. 1058-1065.
Lars K. Rasmussen, Teng J. Lim and Ana-Louise Johansson, "A Matrix-Algebraic Approach to Successive Interference Cancellation in CDMA", IEEE Transactions on Communications, vol. 48, No. 1, Jan. 2000, pp. 145-151.
Anja Klein, Ghassan Kawas Kaleh and Paul W. Baier, "Zero Forcing and Minimum Mean-Square-Error Equalization for Multiuser Detection in Code-Division Multiple-Access Channels", IEEE Transactions on Vehicular Technology, vol. 45, No. 2, May 1996, pp. 276-287.
H.R. Karimi and N.W. Anderson, "A Novel and Efficient Solution to Block-Based Joint-Detection Using Approximate Cholesky Factorization", Ninth IEEE International Symposium, vol. 3, Sep. 8-11, 1998, pp. 1340-1345.

(Continued)

Primary Examiner—Tesfaldet Bocure
(74) Attorney, Agent, or Firm—Volpe and Koenig, P.C.

(57) ABSTRACT

A single transmitter transmits K communication bursts in a shared spectrum in a time slot of a time division duplex communication system. The system associated with N midamble sequences. Each burst has an associated midamble sequence. A receiver receives a vector corresponding to the transmitted midamble sequences of the K communication bursts. A matrix having N identical right circulant matrix blocks is constructed based in part on the known N midamble sequences. The wireless channel between the transmitter and receiver is estimated based on in part one of the N blocks and the received vector.

20 Claims, 3 Drawing Sheets

OTHER PUBLICATIONS

Figure 1:
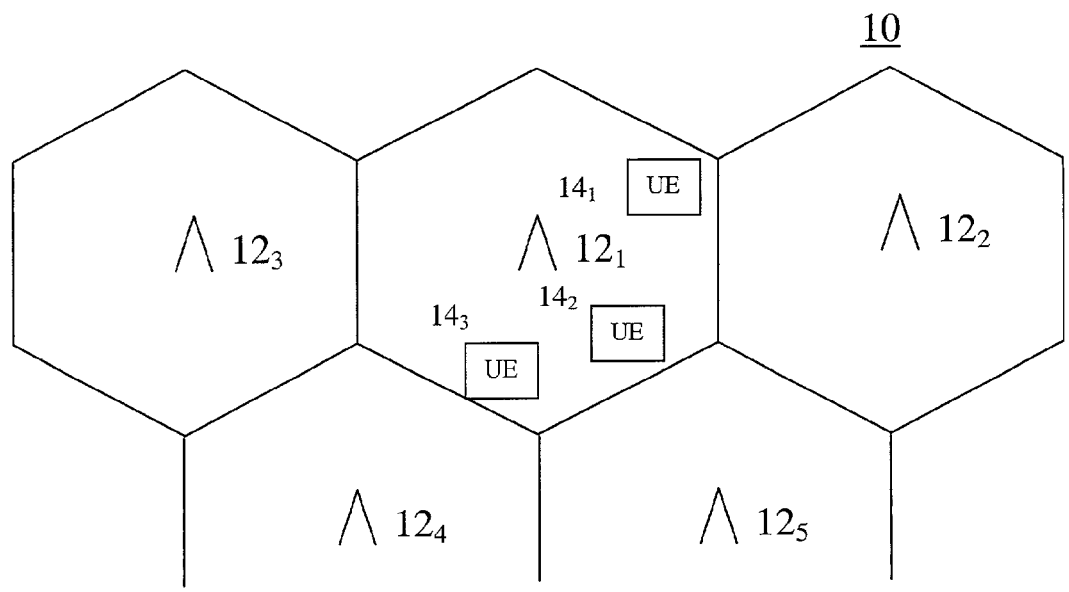

Pulin Patel and Jack Holtzman, "Analysis of a Simple Successive Interference Cancellation Scheme in a DS/CDMA System", IEEE Journal on Selected Areas in Communications, vol. 12, No. 5, Jun. 1994, pp. 796-807.

Andrew L. C. Hui and Khaled Ben Letaief, "Successive Interference Cancellation for Multiuser Asynchronous DS/CDMA Detectors in Multipath Fading Links", IEEE Transactions on Communications, vol. 46, No. 3, Mar. 1998, pp. 384-391.

Youngkwon Cho and Jae Hong Lee, "Analysis of an Adaptive SIC for Near-Far Resistant DS-CDMA", IEEE Transactions on Communications, vol. 46, No. 11, Nov. 1998, pp. 1429-1432.

Tik-Bin Oon, Raymond Steele and Ying Li, "Performance of an Adaptive Successive Serial-Parallel CDMA Cancellation Scheme in Flat Rayleigh Fading Channels", IEEE Transactions on Vehicular Technology, vol. 49, No. 1, Jan. 2000, pp. 130-147.

"Channel Impulse Response Model", UMTS 30.03 version 3.2.0, TR 101 112 version 3.2.0 (1998), pp. 42-43 and 65-66.

3rd Generation Partnership Project; Technical Specificiation Specification Group Radio Access Networks; UTRA (UE) TDD; Radio Transmission and Reception 3G TS 25.102 version 3.3.0 Release 1999, p. 37.

3rd Generation Partnership Project; Technical Specification Group Radio Access Network; Physical Channels and Mapping of Transport Channels onto Physical Channels (TDD), 3G TS 25.221 version 3.2.0 (Mar. 2000), pp. 3-10.

H.R. Karimi et al., "A Novel and Efficient Solution to Block-Based Joint-Detection Using Approximate Cholesky Factorization", IEEE International Symposium on Personal, Indoor and Mobile Radio Communications, vol. 3, 1998, pp. 1340-1345.

J. Malard et al., "Efficiency and Scalability of Two Parallel QR Factorization Algorithms", Proceedings of the Scalable High-Performance Computing Conference (Cat. No. 94TH0637-9), Proceedings of IEEE Scalable High Performance Computing Conference, Knoxville, TN, USA, May 23-25, 1994, pp. 615-622.

Steiner B et al., "Optimum and Suboptimum Channel Estimation for the Uplink of CDMA Mobile Radio Systems with Joint Detection," European Transactions on Telecommunications and Related Technologies, IT, AEI, Milano, vol. 5, No. 1, 1994, pp. 39-50.

Weilin Liu, "Performance of Joint Data and Channel Estimation Using Tap Variable Step-Size (TVSS) LMS for Multipath Fast Fading Channel," Proceedings of the Global Telecommunications Conference (GLOBECOM), Nov. 28, 1994, pp. 973-978.

* cited by examiner

| 50 | Construct a model of the received midamble sequence data, $\bar{r}$, the channel response, $\bar{h}$, and the known midamble codes, such as $$\left[\sum_{k=1}^{K} M^{(k)}\right]\bar{h} = \bar{r}$$ |
|---|---|
| 52 | Reconfigure the model by replacing the known midamble codes with K right circulant matrix blocks, B, such as $$\left[\sum_{k=1}^{K} M^{(k)}\right] = \begin{bmatrix} B \\ B \\ \vdots \\ B \end{bmatrix}$$ |
| 54 | Solve the reconfigure model using a least squares solution, such as by a discrete fourier transform or a single cyclic correlator solution |

Fig. 4

CHANNEL ESTIMATION FOR TIME DIVISION DUPLEX COMMUNICATION SYSTEMS

This application claims priority to U.S. Provisional Patent Application No. 60/175,167, filed on Jan. 7, 2000.

BACKGROUND

The invention generally relates to wireless communication systems. In particular, the invention relates to channel estimation in a wireless communication system.

FIG. 1 is an illustration of a wireless communication system 10. The communication system 10 has base stations $12_1$ to $12_5$ which communicate with user equipments (UEs) $14_1$ to $14_3$. Each base station $12_1$ has an associated operational area where it communicates with UEs $14_1$ to $14_3$ in its operational area.

In some communication systems, such as code division multiple access (CDMA) and time division duplex using code division multiple access (TDD/CDMA), multiple communications are sent over the same frequency spectrum. These communications are typically differentiated by their chip code sequences. To more efficiently use the frequency spectrum, TDD/CDMA communication systems use repeating frames divided into time slots for communication. A communication sent in such a system will have one or multiple associated chip codes and time slots assigned to it based on the communication's bandwidth.

Since multiple communications may be sent in the same frequency spectrum and at the same time, a receiver in such a system must distinguish between the multiple communications. One approach to detecting such signals is single user detection. In single user detection, a receiver detects only the communications from a desired transmitter using a code associated with the desired transmitter, and treats signals of other transmitters as interference. Another approach is referred to as joint detection. In joint detection, multiple communications are detected simultaneously.

To utilize these detection techniques, it is desirable to have an estimation of the wireless channel in which each communication travels. In a typical TDD system, the channel estimation is performed using midamble sequences in communication bursts.

Figure 2:
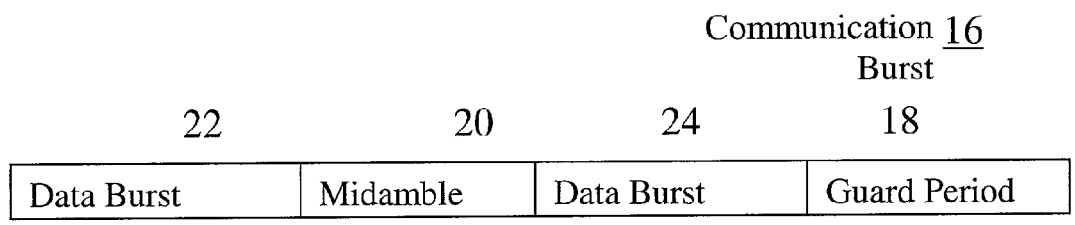

A typical communication burst 16 has a midamble 20, a guard period 18 and two data bursts 22, 24, as shown in FIG. 2. The midamble 20 separates the two data bursts 22, 24 and the guard period 18 separates the communication bursts 16 to allow for the difference in arrival times of bursts 16 transmitted from different transmitters. The two data bursts 22, 24 contain the communication burst's data. The midamble 20 contains a training sequence for use in channel estimation.

After a receiver receives a communication burst 16, it estimates the channel using the received midamble sequence. When a receiver receives multiple bursts 16 in a time slot, it typically estimates the channel for each burst 16. One approach for such channel estimation for communication bursts 16 sent through multiple channels is a Steiner Channel Estimator. Steiner Channel Estimation is typically used for uplink communications from multiple UEs, $14_1$ to $14_3$, where the channel estimator needs to estimate multiple channels.

In some situations, multiple bursts 16 experience the same wireless channel. One case is a high data rate service, such as a 2 megabits per second (Mbps) service. In such a system, a transmitter may transmit multiple bursts in a single time slot. Steiner estimation can be applied in such a case by averaging the estimated channel responses from all the bursts 16. However, this approach has a high complexity. Accordingly, it is desirable to have alternate approaches to channel estimation.

SUMMARY

A single transmitter transmits K communication bursts in a shared spectrum in a time slot of a time division duplex communication system. The system associated with N midamble sequences. Each burst has an associated midamble sequence. A receiver receives a vector corresponding to the transmitted midamble sequences of the K communication bursts. A matrix having N identical right circulant matrix blocks is constructed based in part on the known N midamble sequences. The wireless channel between the transmitter and receiver is estimated based on in part one of the N blocks and the received vector.

BRIEF DESCRIPTION OF THE DRAWING(S)

Figure 3:
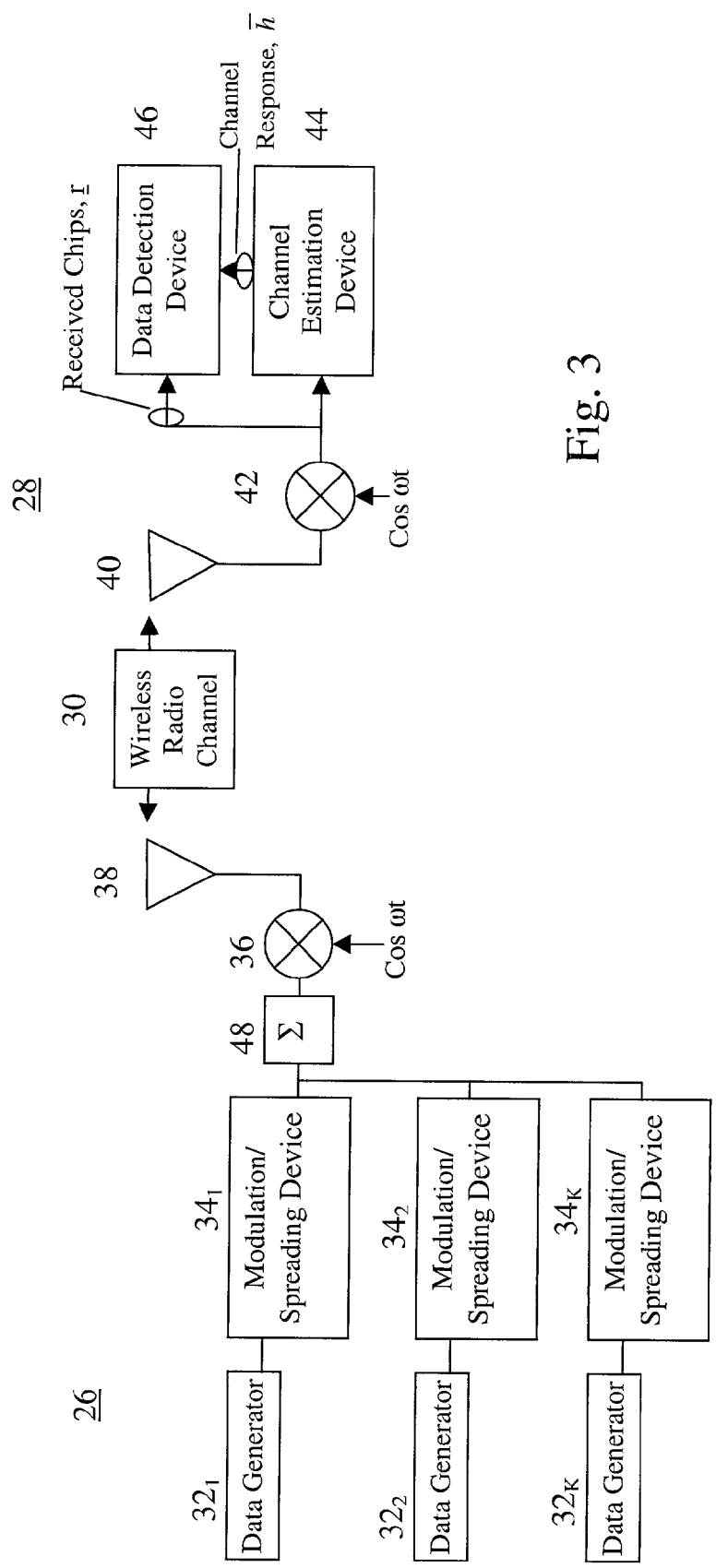

FIG. 1 is a wireless communication system.
FIG. 2 is an illustration of a communication burst.
FIG. 3 is a simplified multiburst transmitter and receiver.
FIG. 4 is a flow chart of multiburst channel estimation.

DETAILED DESCRIPTION OF THE PREFERRED EMBODIMENT(S)

FIG. 3 illustrates a simplified multicode transmitter 26 and receiver 28 in a TDD/CDMA communication system. In a preferred application, such as a 2 Mbs downlink service, the receiver 28 is in a UE $14_1$ and the transmitter 26 is in a base station $12_1$, although the receiver 28 and transmitter 26 may be used in other applications.

The transmitter 26 sends data over a wireless radio channel 30. The data is sent in K communication bursts. Data generators $32_1$ to $32_K$ in the transmitter 26 generate data to be communicated to the receiver 28. Modulation/spreading and training sequence insertion devices $34_1$ to $34_K$ spread the data and make the spread reference data time-multiplexed with a midamble training sequence in the appropriate assigned time slot and codes for spreading the data, producing the K communication bursts. Typical values of K for a base station $12_1$ transmitting downlink bursts are from 1 to 16. The communication bursts are combined by a combiner 48 and modulated by a modulator 36 to radio frequency (RF). An antenna 38 radiates the RF signal through the wireless radio channel 30 to an antenna 40 of the receiver 28. The type of modulation used for the transmitted communication can be any of those known to those skilled in the art, such as binary phase shift keying (BPSK) or quadrature phase shift keying (QPSK).

The antenna 40 of the receiver 28 receives various radio frequency signals. The received signals are demodulated by a demodulator 42 to produce a baseband signal. The baseband signal is processed, such as by a channel estimation device 44 and a data detection device 46, in the time slot and with the appropriate codes assigned to the transmitted communication bursts. The data detection device 46 may be a multiuser detector or a single user detector. The channel estimation device 44 uses the midamble training sequence component in the baseband signal to provide channel information, such as channel impulse responses. The channel information is used by the data detection device 46 to estimate the transmitted data of the received communication bursts as hard symbols.

To illustrate one implementation of multiburst channel estimation, the following midamble type is used, although multiburst channel estimation is applicable to other midamble types. The K midamble codes, $m^{(k)}$, where k=1 . . . K, are derived as time shifted versions of a periodic single basic midamble code, $m_P$, of period P chips. The length of each midamble code is $L_m$=P+W−1. W is the length of the user channel impulse response. Typical values for $L_m$ are 256 and 512 chips. W is the length of the user channel impulse response. Although the following discussion is based on each burst having a different midamble code, some midambles may have the same code. As, a result, the analysis is based on N midamble codes, N<K. Additionally, the system may have a maximum number of acceptable midamble codes N. The receiver 28 in such a system may estimate the channel for the N maximum number of codes, even if less than N codes are transmitted.

The elements of $m_P$ take values from the integer set {1, −1}. The sequence $\bar{m}_P$ is first converted to a complex sequence $\tilde{m}_P[i] = j^i \cdot m_P[i]$, where i=1 . . . P. The $m^{(k)}$ are obtained by picking K sub-sequences of length $L_m$ from a 2 P long sequence formed by concatenating two periods of $\tilde{m}_P$. The $i^{th}$ element of $m^{(k)}$ is related to $\tilde{m}_P$ by Equation 1.

$$\underline{m}_i^{(k)} = \tilde{m}_P[(K-k)W + i], \quad \text{for } 1 \le i \le P - (K-k)W$$
$$= \tilde{m}_P[i - P + (K-k)W], \quad \text{for } P - (K-k)W \le i \le P + W - 1$$

Equation 1

Thus, the starting point of $m^{(k)}$, k=1 . . . K shifts to the right by W chips as k increases from 1 to K.

The combined received midamble sequences are a superposition of the K convolutions. The $k^{th}$ convolution represents the convolution of $m^{(k)}$ with $\overline{h(k)} \cdot \overline{h^{(k)}}$ is the channel response of the $k^{th}$ user. The preceding data field in the burst corrupts the first (W−1) chips of the received midamble. Hence, for the purpose of channel estimation, only the last P of $L_m$ chips are used to estimate the channel.

Multiburst channel estimation will be explained in conjunction with the flow chart of FIG. 4. To solve for the individual channel responses $\overline{h^{(k)}}$, Equation 2 is used.

$$\begin{bmatrix} m_P & \cdots & m_{(K-1)W+1} & m_{(K-1)W} & \cdots & m_{(K-2)W+1} \\ m_1 & \cdots & m_{(K-1)W+2} & m_{(K-1)W+1} & \cdots & m_{(K-2)W+2} \\ m_2 & \cdots & m_{(K-1)W+3} & m_{(K-1)W+2} & \cdots & m_{(K-2)W+3} \\ \vdots & \vdots & \vdots & \vdots & \vdots & \vdots \\ m_{KW-1} & \vdots & m_{(K-1)W} & m_{(K-1)W-1} & \cdots & m_{(K-2)W} \end{bmatrix}$$

$$\cdots \begin{bmatrix} m_W & \cdots & m_1 \\ m_{W+1} & \cdots & m_2 \\ m_{W+2} & \cdots & m_3 \\ \vdots & \vdots & \vdots \\ m_{W-1} & & m_P \end{bmatrix} \times \begin{bmatrix} \underline{h}^{(1)} \\ \underline{h}^{(2)} \\ \vdots \\ \underline{h}^{(K)} \end{bmatrix} = \begin{bmatrix} r_W \\ r_{W+1} \\ r_{W+2} \\ \vdots \\ r_{L_m} \end{bmatrix}$$

Equation 2

$r_W \ldots r_{LM}$ are the received combined chips of the midamble sequences. The m values are the elements of $m_P$.

Equation 2 may also be rewritten in shorthand as Equation 3.

$$\sum_{k=1}^{K} M^{(k)} \overline{h^{(k)}} = \bar{r}$$

Equation 3

Each $M^{(k)}$ is a KW-by-W matrix. $\bar{r}$ is the received midamble chip responses. When all the bursts travel through the same channel, $\overline{h^{(1)}} \ldots \overline{h^{(k)}}$ can be replaced by $\bar{h}$ as in Equation 4, 50.

$$\left[\sum_{k=1}^{K} M^{(k)}\right] \bar{h} = \bar{r}$$

Equation 4

G is defined as per Equation 5.

$$G = [M^{(1)}, \ldots, M^{(k)}, \ldots, M^{(k)}]$$

Equation 5

As a result, G is a KW-by-KW matrix. Since G is a right circulant matrix, Equation 4 can be rewritten using K identical right circulant matrix blocks B, as per Equation 6, 52.

$$\left[\sum_{k=1}^{K} M^{(k)}\right] = \begin{bmatrix} B \\ B \\ \vdots \\ B \end{bmatrix} = D$$

Equation 6

B is a W-by-W right circulant matrix. The number of B-blocks is K. Using Equation 6, Equation 4 can be rewritten as Equation 7.

$$D\bar{h} = \bar{r}$$

Equation 7

Equation 7 describes an over-determined system with dimensions KW-by-W. One approach to solve Equation 7 is a least squares solution, 54. The least squares solution of Equation 7 is given by Equation 8.

$$\bar{h} = (D^H D)^{-1} D^H \bar{r}$$

Equation 8

$D^H$ is the hermitian of D.

Applying Equation 6 to Equation 8 results in Equation 9.

$$(D^H D)^{-1} = \frac{1}{K} (B^H B)^{-1}$$

Equation 9

The received vector $\bar{r}$ of dimension KW can be decomposed as per Equation 10.

$$\bar{r} = \begin{bmatrix} \overline{r_1} \\ \overline{r_2} \\ \vdots \\ \overline{r_k} \end{bmatrix} \quad \text{Equation 10}$$

The dimension of $\overline{r_k}$ is W. Substituting Equations 9 and 10 into Equation 8, the least-squares solution for the channel coefficients per Equation 11 results.

$$\hat{\bar{h}} = (B^H B)^{-1} B^H \left( \frac{1}{K} \sum_{k=1}^{K} \overline{r_k} \right) = (B^H B)^{-1} B^H \overline{\overline{r_k}} \quad \text{Equation 11}$$

$\overline{\overline{r_k}}$ represents the average of the segments of $\bar{r}$. Since B is a square matrix, Equation 11 becomes Equation 12.

$$\bar{h} = B^{-1} \overline{\overline{r_k}} \quad \text{Equation 12}$$

Since B is a right circulant matrix and the inverse of a right circulant matrix is also right circulant, the channel estimator can be implemented by a single cyclic correlator of dimension 57, or by a discrete fourier transform (DFT) solution.

A W point DFT method is as follows. Since B is right circulant, Equation 13 can be used.

$$B = D_W^{-1} \cdot \Lambda_C \cdot D_W \quad \text{Equation 13}$$

$D_W$ is the W point DFT matrix as per Equation 14.

$$D_W = \begin{bmatrix} \tilde{W}^0 & \tilde{W}^0 & \tilde{W}^0 & \tilde{W}^0 & \cdots & \tilde{W}^0 \\ \tilde{W}^0 & \tilde{W}^1 & \tilde{W}^2 & \tilde{W}^3 & \cdots & \tilde{W}^{(W-1)} \\ \tilde{W}^0 & \tilde{W}^2 & \tilde{W}^4 & \tilde{W}^6 & \cdots & \tilde{W}^{2(W-1)} \\ \tilde{W}^0 & \tilde{W}^3 & \tilde{W}^6 & \tilde{W}^9 & \cdots & \tilde{W}^{3(W-1)} \\ \vdots & \vdots & \vdots & \vdots & \cdots & \vdots \\ \tilde{W}^0 & \tilde{W}^{(W-1)} & \tilde{W}^{2(W-1)} & \tilde{W}^{3(W-1)} & \cdots & \tilde{W}^{(W-1)(W-1)} \end{bmatrix} \quad \text{Equation 14}$$

$\Lambda_C$ is a diagonal matrix whose main diagonal is the DFT of the first column of B, as per Equation 15.

$$\Lambda_C = \text{diag}(D_W(B(:,1))) \quad \text{Equation 15}$$

$$\tilde{W} = e^{-j\frac{2\pi}{W}}.$$

Thus, $D_W$ is the DFT operator so that $D_W x$ represents the W point DFT of the vector $x$. By substituting Equation 13 into Equation 12 and using $$D_W^{-1} = \frac{D_W^*}{W},$$

results in Equation 16.

$$\bar{h} = \left( D_W^* \cdot \frac{1}{W} \cdot \Lambda_C^{-1} \cdot D_W \right) \bar{r} \quad \text{Equation 16}$$

$D_W^*$ is the element-by-element complex conjugate of $D_W$.

Alternately, an equivalent form that expresses $\bar{h}$ in terms of $\Lambda_R$ instead of $\Lambda_C$ can be derived. $\Lambda_R$ is a diagonal matrix whose main diagonal is the DFT of the first row of B per Equation 17.

$$\Lambda_R = \text{diag}(D_W(B(1,:))) \quad \text{Equation 17}$$

Since the transpose of B, $B^T$, is also right circulant and that its first column is the first row of B, $B^T$ can be expressed by Equation 18.

$$B^T = D_W^{-1} \cdot \Lambda_R \cdot D_W \quad \text{Equation 18}$$

Using Equation 18 and that $D_W^T = D_W$, $\Lambda^T_R = \Lambda_R$ and that for any invertible matrix A, $(A^T)^{-1} = (A^{-1})^T$, B can be expressed as per Equation 19.

$$B = D_W \cdot \Lambda_R \cdot D_W^{-1} \quad \text{Equation 19}$$

Substituting Equation 19 into Equation 12 and that $$D_W^{-1} = \frac{D_W^*}{W}$$

results in Equation 20.

$$\bar{h} = \left( D_W \cdot \Lambda_R^{-1} \cdot \frac{1}{W} D_W^* \right) \bar{r} \quad \text{Equation 20}$$

Equations 16 or 20 can be used to solve for $\bar{h}$. Since all DFTs are of length W, the complexity in solving the equations is dramatically reduced.

An approach using a single cycle correlator is as follows. Since $B^{-1}$ is the inverse of a right circulant matrix, it can be written as Equation 21.

$$B^{-1} = T = \begin{bmatrix} T_1 & T_P & \cdots & T_3 & T_2 \\ T_2 & T_1 & \cdots & T_4 & T_3 \\ \vdots & \vdots & \cdots & \vdots & \vdots \\ T_{W-1} & T_{W-2} & \cdots & T_1 & T_W \\ T_W & T_{W-1} & \cdots & T_2 & T_1 \end{bmatrix} \quad \text{Equation 21}$$

The first row of the matrix T is equal to the inverse DFT of the main diagonal of $\Lambda_R^{-1}$. Thus, the matrix T is completely determined by $\Lambda_R^{-1}$.

The taps of the channel response $\bar{h}$ are obtained successively by an inner product of successive rows of T with the average of W-length segments of the received vector $\bar{r}$. The successive rows of T are circularly right shifted versions of the previous row. Using registers to generate the inner product, the first register holds the averaged segments of $\bar{r}$, and the second register is a shift register that holds the first row of the matrix T. The second register is circularly shifted at a certain clock rate. At each cycle of the clock, a new element of $\bar{h}$ is determined by the inner product of the vectors stored in the two registers. It is advantageous to shift the first row of the matrix T rather than the received midambles. As a result, no extra storage is required for the midambles. The midambles continue to reside in the received buffer that holds the entire burst. Since the correlator length is only W, a significant reduction in complexity of estimating the channel is achieved.

What is claimed is:

1. A method for estimating a wireless channel in a time division duplex communication system using code division multiple access, the system associated with N midamble sequences, the wireless channel existing between a single transmitter and a single receiver, the single transmitter transmitting K communication bursts in a shared spectrum in a time slot, each burst having an associated midamble sequence of the N sequences, the receiving knowing the N midamble sequences, the method comprising:
   receiving a vector corresponding to the transmitted midamble sequences of the K communication bursts at the single receiver;
   constructing a matrix having N identical right circulant matrix blocks based in part on the known N midamble sequences; and
   estimating the wireless channel based on in part one of the N blocks and the received vector.

2. The method of claim 1 wherein the wireless channel estimating is performed using a least squares solution.

3. The method of claim 2 wherein the least squares solution is implemented using a single cyclic correlator.

4. The method of claim 2 wherein the least squares solution is implemented using a discrete fourier transform solution.

5. The method of claim 1 wherein N is a maximum number of midamble codes associated with the system.

6. The method of claim 1 wherein N is a number of different midambles transmitted in the K bursts.

7. The method of claim 1 wherein a dimension of the estimation is a length of a channel response of the wireless channel.

8. A receiver for use in a wireless time division duplex communication system using code division multiple access, the system associated with N midamble sequences, a single transmitter in the system transmits K communication bursts in a shared spectrum in a time slot, each burst having an associated midamble sequence of the N sequences, the receiver knowing the N midamble sequences, the receiver comprising:
   an antenna for receiving the K communication bursts including a vector corresponding to the transmitted midamble sequences of the bursts;
   a channel estimator for constructing a matrix having N identical right circulant-matrix blocks based in part on the known N midamble sequences and estimating the wireless channel between the receiver and the single transmitter based on in part one of the N blocks and the received vector; and
   a data detector for recovery data from the received communication bursts using the estimated wireless channel.

9. The receiver of claim 8 wherein the data detector is a multiuser detector.

10. The receiver of claim 8 wherein the data detector is a single user detector.

11. The receiver of claim 8 wherein the wireless channel estimating is performed using a least squares solution.

12. The receiver of claim 11 wherein the least squares solution is implemented using a discrete fourier transform solution.

13. The receiver of claim 11 wherein the least squares solution is implemented using a single cyclic correlator.

14. A wireless spread spectrum communication system using code division multiple access associated with N midamble sequences, the system communicating using communication bursts, each burst having an associated midamble sequence, the system comprising:
   a base station comprising:
      a data generator for generating data;
      a plurality of modulation/spreading devices for formatting the generated data into K communication bursts time multiplexed to be in a same time slot and in a shared spectrum; and
      an antenna for radiating the K communication bursts; and
   a user equipment comprising:
      an antenna for receiving the K communication bursts including a vector corresponding to the transmitted midamble sequences of the bursts;
      a channel estimator for constructing a matrix having N identical right circulant matrix blocks based in part on the N midamble sequences and estimating the wireless channel between the base station and the user equipment based on in part the K block matrix and the received vector; and
      a data detector for recovering data from the received communication bursts using the estimated wireless channel.

15. The system of claim 14 wherein the data detector is a multiuser detector.

16. The system of claim 14 wherein the data detector is a plurality of single user detectors.

17. The system of claim 14 wherein the wireless channel estimating is performed using a least squares solution.

18. The system of claim 17 wherein the least squares solution is implemented using a discrete fourier transform solution.

19. The system of claim 17 wherein the least squares solution is implemented using a single cyclic correlator.

20. The system of claim 14 wherein the base station is effectively transmitting data at a 2 Mbps data rate to the user equipment.

* * * * *

UNITED STATES PATENT AND TRADEMARK OFFICE
CERTIFICATE OF CORRECTION

PATENT NO. : 6,985,513 B2
APPLICATION NO. : 09/755400
DATED : January 10, 2006
INVENTOR(S) : Ariela Zeira It is certified that error appears in the above-identified patent and that said Letters Patent is hereby corrected as shown below:

IN THE TITLE PAGE

At section (56), OTHER PUBLICATIONS, page 1, right column, after the word "Using", insert --Fast--.

At section (56), OTHER PUBLICATIONS, page 2, left column, line 22 before the word "Group", delete "Specification".

IN THE ABSTRACT

At section (57), ABSTRACT, right column, line 3, after the word "system" insert --is--.

IN THE SPECIFICATIONS

At column 2, line 11, after the word "system", insert --is--.

At column 2, line 32, after "2", delete "Mbs" and insert therefor --Mbps--.

At column 3, line 13, after the word "As", delete ",".

At column 3, line 21, after the word "sequence", delete "$\tilde{m}_p[i] = j^i \cdot \underline{m_p}[i]$" and insert therefore -- $\underline{\tilde{m}_P[i]} = j^i \cdot \underline{m_P[i]}$ --.

At column 3, line 23, after the word "of," delete "$\tilde{m}_p$" and insert therefor -- $\underline{\tilde{m}_P}$ --.

At column 3, line 24, after the word "to", delete "$\tilde{m}_p$" and insert therefor -- $\underline{\tilde{m}_P}$ --.

At column 3, line 38, after the word "with", delete " $\overline{h(k)} \cdot \overline{h^{(k)}}$ " and insert therefor -- $\overline{h^{(k)}} \cdot \overline{h^{(k)}}$ --.

UNITED STATES PATENT AND TRADEMARK OFFICE
CERTIFICATE OF CORRECTION

PATENT NO. : 6,985,513 B2
APPLICATION NO. : 09/755400
DATED : January 10, 2006
INVENTOR(S) : Ariela Zeira It is certified that error appears in the above-identified patent and that said Letters Patent is hereby corrected as shown below:

At column 4, line 20, delete "$G = [M^{(1)}, \ldots, M^{(k)}, \ldots, M^{(k)}]$", and insert therefor -- $G = [M^{(1)}, \ldots, M^{(k)}, \ldots, M^{(K)}]$ --.

At column 4, lines 24-25, after the word "Equation", delete "6, 52." and insert therefor --6.--.

Signed and Sealed this

Seventeenth Day of October, 2006

JON W. DUDAS
*Director of the United States Patent and Trademark Office*